L. S. EDLEBLUTE.
Revolving Horse Hay-Rake.
No. 217,595. Patented July 15, 1879.
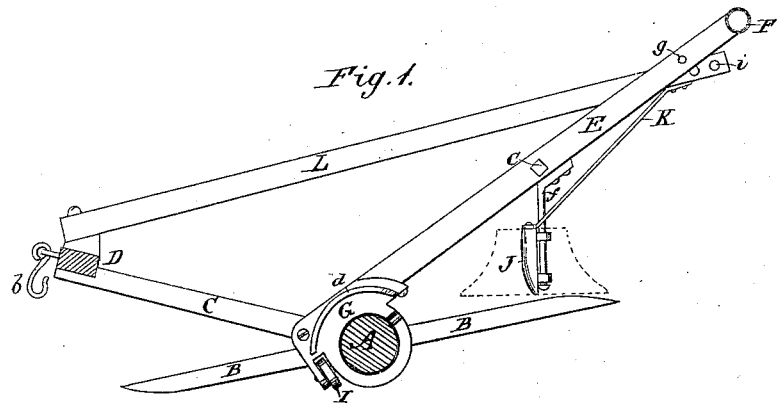
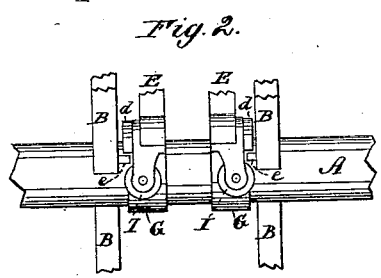
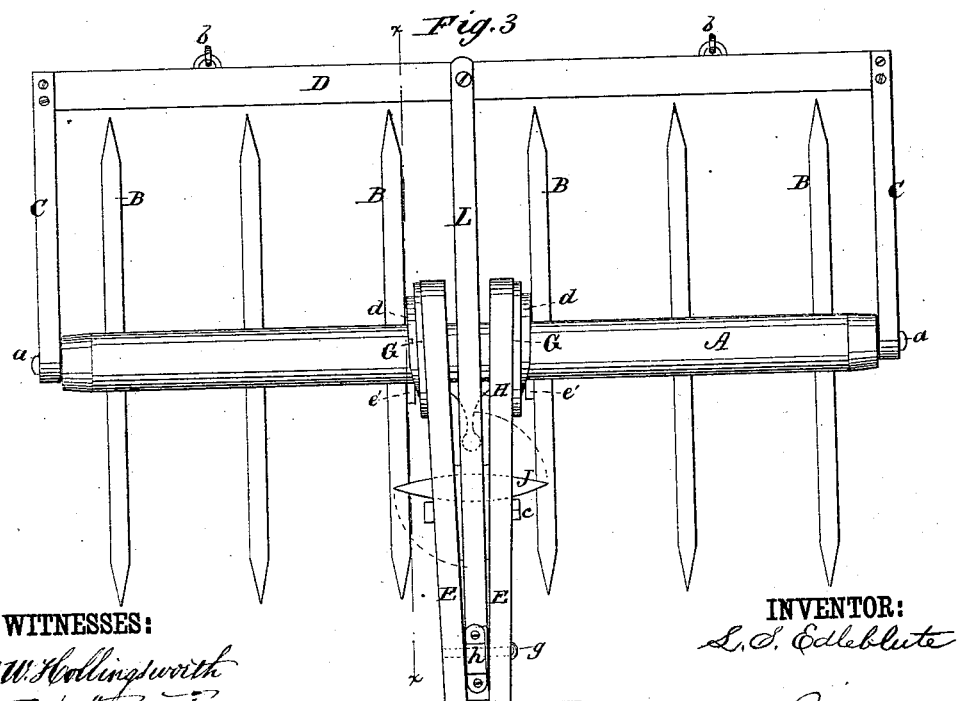
WITNESSES:
W. W. Hollingsworth
Edw. W. Byrn
INVENTOR:
L. S. Edleblute
BY
ATTORNEYS.

UNITED STATES PATENT OFFICE.

LUCIUS S. EDLEBLUTE, OF CINCINNATI, OHIO.

IMPROVEMENT IN REVOLVING HORSE HAY-RAKES.

Specification forming part of Letters Patent No. 217,595, dated July 15, 1879; application filed June 17, 1879.

*To all whom it may concern:*

Be it known that I, LUCIUS S. EDLEBLUTE, of Cincinnati, in the county of Hamilton and State of Ohio, have invented a new and Improved Horse Hay-Rake; and I do hereby declare that the following is a full, clear, and exact description of the same, reference being had to the accompanying drawings, forming part of this specification, in which—

Figure 1 is a vertical section through line $x$ $x$ of Fig. 3. Fig. 2 is a detail underneath view of the locking devices. Fig. 3 is a plan view.

My invention relates to an improvement in horse hay-rakes of that form in which the rake-teeth project from both sides of an intermittingly-rotating shaft; and the improvement consists in peculiar means for controlling said revolution, as hereinafter fully described, and pointed out in the claims.

In the drawings, A represents the revolving shaft, having rake-teeth B, which extend continuously through mortises in said shaft, and project an equal distance upon each side of the same. Said shaft A is journaled at its ends in bearings $a$ in the rear ends of the side bars, C, which side bars are connected at their front ends by the draft-bar D, having hooks or connections $b\ b$, for the attachment of the team.

E E are the handles, which have a cross-bar, F, at their rear ends, and are connected near the middle by a block and bolt, $c$, passing through said handles and interposed block. To the front ends of these handles are securely fastened metallic cuffs G G, made preferably of malleable iron, which cuffs embrace and form middle bearings for the rake-shaft. Said cuffs are provided upon their outside faces with laterally-projecting cam-flanges $d\ d$, with which lugs $e\ e$, rigidly attached to the rake-shaft, engage to force the front ends of the handles together, the said front ends of the handles being forced apart by an interposed spring, H.

I I are friction-wheels arranged upon the front sides of the cuffs and at the ends of the cam-flanges, and between which wheels and the end of the cam-flanges the lugs $e$ are locked.

Now, in operating the rake, as so far described, the lugs $e$ being held between the friction-wheels I and the ends of the flanges $d$, the team drags the rake across the field with the points of the rake-teeth resting on the ground, the friction-wheels I, in conjunction with the spring H, holding the lug $e$ and preventing the rake from revolving. When, however, a sufficient quantity of hay has accumulated upon the rake, the handles E are depressed and pushed forward. This makes the teeth of the rake engage with the ground, and causes the lugs to press against the friction-rollers I and force the two handles together against the tension of the spring H. The lugs $e$ then being disengaged from their locking-seat between the roller and flange, the rake-shaft revolves, dumping the load of hay, and bringing the other set of teeth forward into position. As the other set of teeth are brought forward, a diametrical set of lugs, $e'\ e'$, on the shaft strike the cam-flanges $d$, and, after forcing the handles together, seat themselves between said cam-flanges and the friction-rollers, to hold the rake to its position until another semi-revolution is necessary.

For smooth ground the rollers may not be used; but where the ground is rough and the rake has a tendency to revolve too frequently they will be required; and in connection with the same I have provided other devices to prevent this accidental revolution.

To the lower part of the block, between the handles, I fix a rod, $f$, and upon the same I pivot a stop-foot, J, near its middle. This stop-foot is slightly longer than the distance between the rake-teeth, and is arranged on its pivot so as to be turned either crosswise of the rake-teeth or parallel with the same, as shown in dotted lines. When arranged parallel with the teeth the rake can revolve, but when arranged crosswise it rests above the rake-teeth and prevents revolution. This adjustable device is operated to positively control the revolution of the rake in the following manner: To one side of its pivot I fix one end of a rod, K, the other end of which rod is fastened to a bar, L. This bar L is attached at its forward end to the draft-bar, and at its rear end passes between the handles, and is loosely connected therewith by a bolt, $g$, and slot or strap $h$. Now, when the rake is operating, it will be seen that, with the stop-foot resting crosswise the teeth, the rake is absolutely prevented from turning, no matter how rough the ground might be.

When it is desired to turn the rake, however, the cross-piece of the handles is pushed forward, and as the handles move forward the bar L passes to the rear between the same, and a tension is put on the rod K, which causes the stop-foot to be turned parallel with the teeth, in which position the rake is free to revolve.

By pulling the handles to the rear the stop-foot is restored to its crosswise position.

By attaching a rope to one of the holes $i$ on the rear end of the bar L, and extending said rope over the cross-piece of the handles, and then to the front, the devices may be readily operated on horseback.

Having thus described my invention, what I claim as new is—

1. The combination, with the rake-shaft having lugs $e\ e'$, of the spring-pressed handles E E, provided with metal cuffs embracing the rake-shaft, said cuffs being provided with locking-seats for the lugs, substantially as shown and described.

2. The metal cuffs G, provided with cam-flanges and friction-rollers, in combination with the rake-shaft and the spring-pressed handles, substantially as set forth.

3. The combination, with the rake and the spring-pressed handles E, having cuffs G, of the swiveling stop-foot J, rod K, bar L, and draft-bar D, substantially as and for the purpose described.

LUCIUS S. EDLEBLUTE

Witnesses:
C. C. ARCHER,
ALICE ARCHER.